United States Patent [19]

Millett et al.

[11] Patent Number: 4,546,949
[45] Date of Patent: Oct. 15, 1985

[54] MOUNT

[75] Inventors: Robert A. Millett, Newport Beach; James A. Millett, Costa Mesa, both of Calif.

[73] Assignee: ROI Development Corp., Santa Ana, Calif.

[21] Appl. No.: 569,505

[22] Filed: Jan. 9, 1984

[51] Int. Cl.[4] .............................................. H01Q 1/32
[52] U.S. Cl. .................................... 248/514; 248/230; 403/191; 403/234; 343/715
[58] Field of Search ............... 248/514, 515, 535, 541, 248/230, 218.4, 219.4, 539–540; 403/191, 190, 234, 235, 237; 343/715

[56] References Cited

U.S. PATENT DOCUMENTS

| | | | |
|---|---|---|---|
| 369,971 | 9/1887 | Stillman | 248/515 |
| 1,042,708 | 10/1912 | Miley | 403/235 |
| 1,245,917 | 11/1917 | Hewitt | 403/235 |
| 3,003,149 | 10/1961 | Grashow | 343/715 |
| 3,157,378 | 11/1964 | Blum | 248/230 |
| 3,545,148 | 12/1970 | Mandino | 248/220.2 |
| 4,114,159 | 9/1978 | Verini | 248/539 |
| 4,161,735 | 7/1979 | Zylla | 343/715 |
| 4,209,788 | 6/1980 | Plantier | 343/715 |

FOREIGN PATENT DOCUMENTS

| | | | |
|---|---|---|---|
| 967109 | 10/1950 | France | 248/230 |
| 2028411 | 3/1980 | United Kingdom | 403/234 |

OTHER PUBLICATIONS

Literature of Helm Products, Inc., of Chicago, Ill., Dated 1980 on "Gimbaled Bracket Bar-B-Que Adapter".

Primary Examiner—J. Franklin Foss
Assistant Examiner—Robert A. Olson
Attorney, Agent, or Firm—Edward J. DaRin

[57] ABSTRACT

A mount for a tubular supporting rail of a marine vessel for securing an antenna to the mount by means of an antenna ferrule. The mount includes clamping elements adapted to be secured to the supporting rail and carrying a threaded securing post, one clamping element has a cylindrical end to rotatably mount an L-shaped hollow rotary member that is mounted to the cylindrical end of the one clamping element and is rotatably positioned thereto. The L-shaped member includes an outwardly extending mounting post for securing objects thereto and thereby the supporting rail.

7 Claims, 7 Drawing Figures

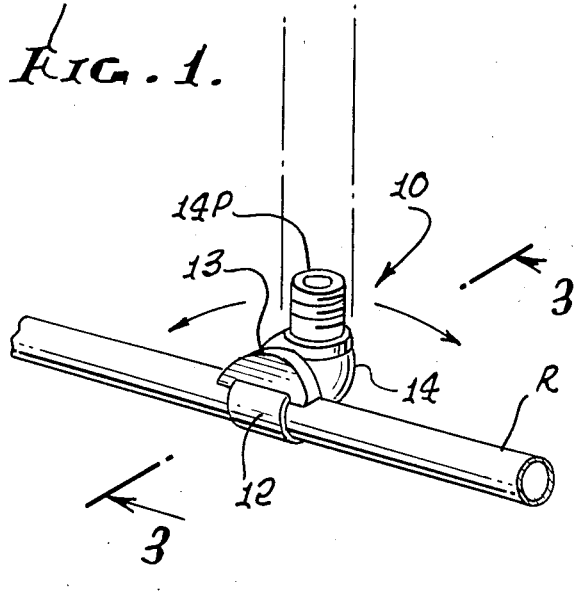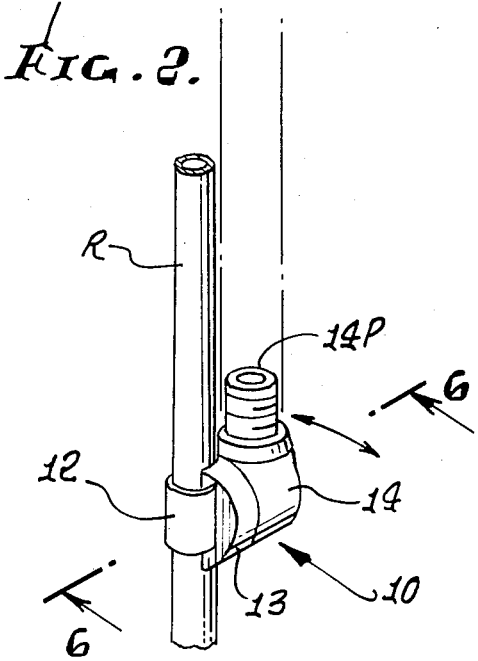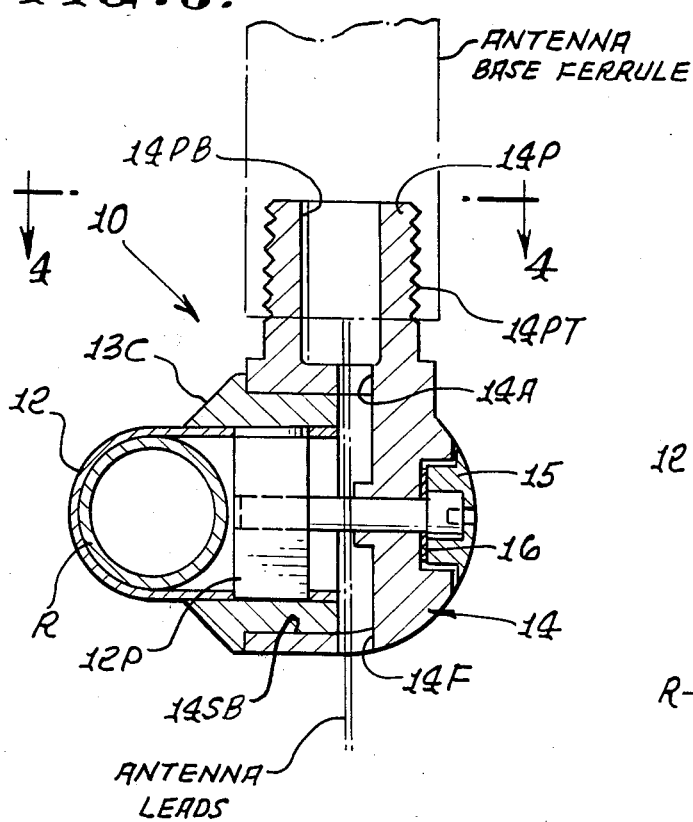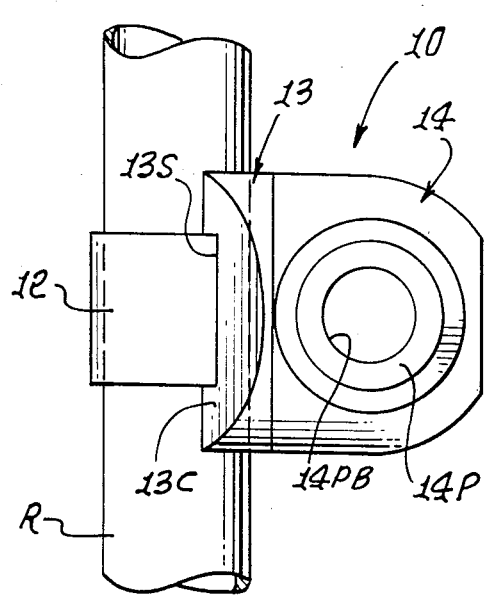

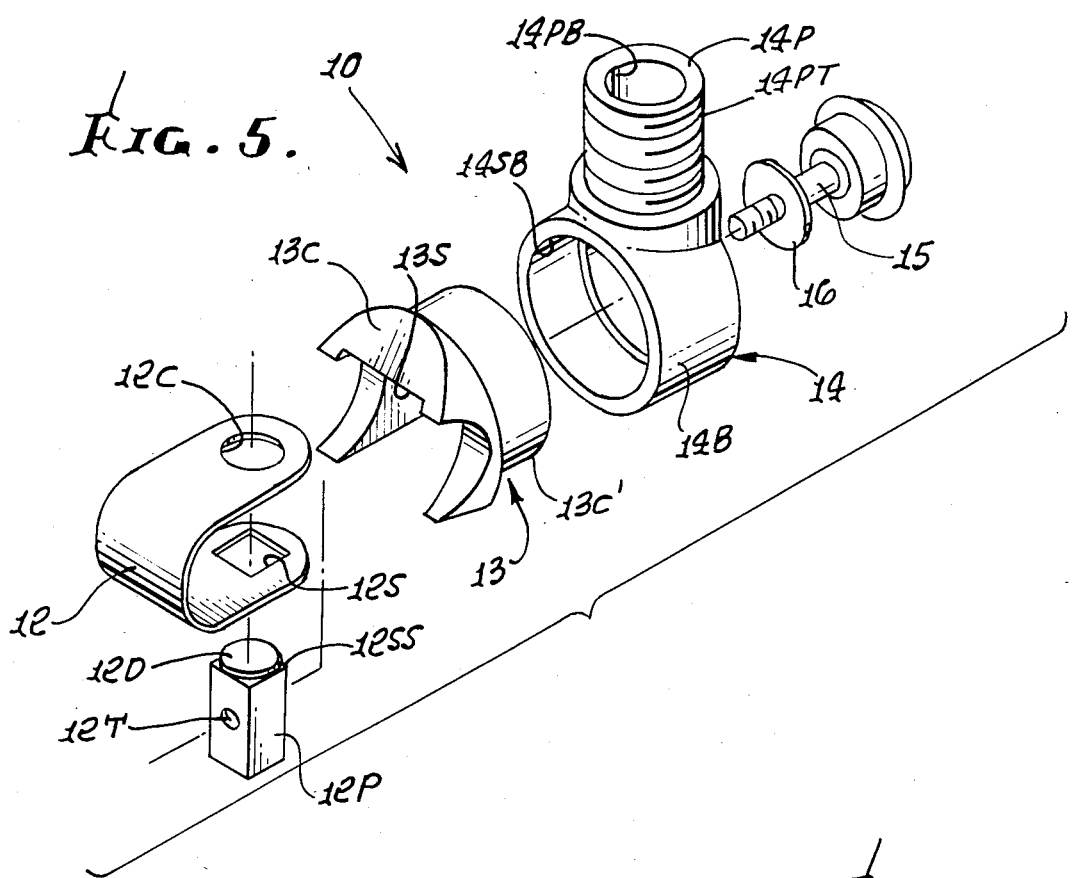
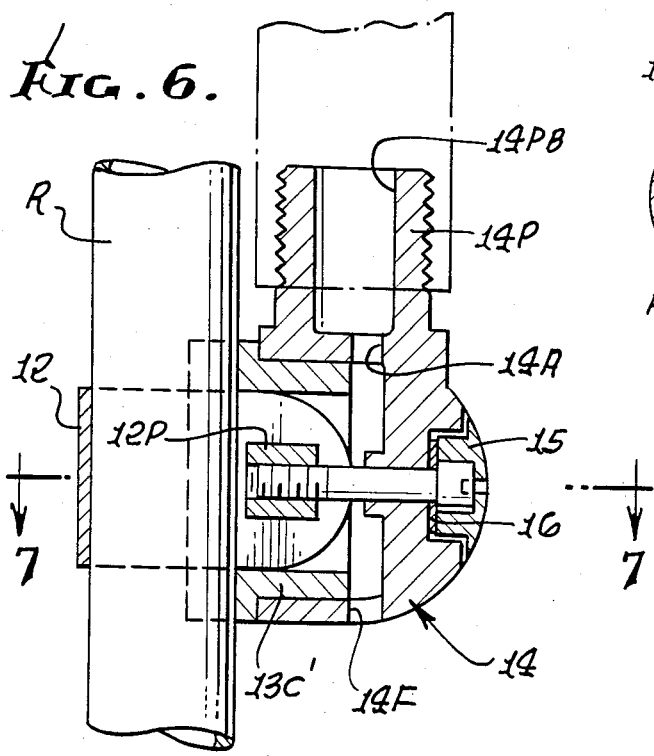
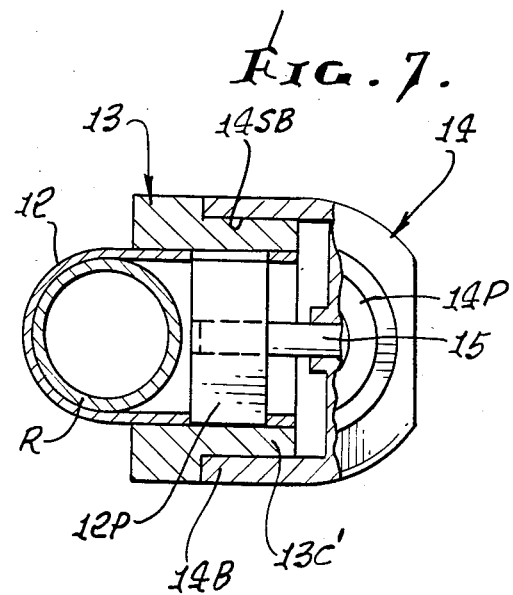

MOUNT

FIELD OF INVENTION

This invention relates to a mount, and, in particular, to a mount for a marine antenna, or similar device.

BACKGROUND OF INVENTION

Various types of mounting devices are known in the prior art. Some of these mounting devices are especially useful for marine vessels such as ships, boats, or the like, for mounting antennas for Loran equipment. These prior art antenna mounts are generally designed to be secured to a deck or bulkhead of a marine vessel, or the like, by means of a flat supporting plate that is secured to the deck or bulkhead of a marine vessel, and may be constructed of stainless steel or plastic. These prior art antenna mounts are designed to accommodate standard antenna base ferrules for securing antennas thereto and may include integral feed-through holes for the antenna cables.

It is desirable on a variety of ships or boats to secure antennae or other devices to railings located in various locations on the marine vessel. The railings may be disposed in various planes relative to the body of water that the vessel is supported in, including vertical, horizontal, or angular orientations. When the mount is used to secure an antenna, it is usually necessary that the antenna be in a plane normal to the plane of the water. The sensitivity of the antenna may vary with respect to its orientation relative to the electrical signal it is receiving and, therefore, any mount should have the capability of easy and varied orientation relative to the rail it is mounted on to allow the antenna's position to be varied for maximizing the signal reception. It is desirable for a mount adapted to be secured to a rail or similar supporting member, to be designed for easy orientation thereof and preferably provide infinite positioning. At the present time, there are commercially available mounts that may be secured to a rail or the like on a marine vessel for securing antennae, barbecues, or the like. The prior art devices are in the form of C-clamps used with plastic sleeves mounted on the rail to prevent the C-clamp from marring the mounting rail. These clamps are of a simple construction and are generally employed to mount an antenna. There is also commercially available a gimbaled bracket that is mounted to a boat rail for supporting a barbecue thereon and which allows a commercially available barbecue to be universally mounted to a boat rail.

SUMMARY OF INVENTION

The present invention provides an improved, relatively inexpensive mount that is especially adapted to be used on a marine vessel, such as a ship or boat, and mountable on a boat rail or the like and which can be simply and reliably installed with a minimum of fastening devices and tools in a minimum length of time. The improved rail mount is simply constructed and defined to allow the mount to be positioned in a multiplicity of positions relative to the supporting member. The mount of the present invention can be secured to a boat rail with a device attached thereto extending outboard of the rail to preserve the usable space inboard of the rail. The mount is advantageously constructed to be clamped to the mounting rail without damaging the rail and yet allow it to be readily removed therefrom and/or relocated. The improved mount is attractive in appearance and has a smooth outer configuration so as to minimize marine lines from becoming entangled with the mount. When the mount is usable for securing a marine antenna, it is provided with a feed-through aperture to allow the antenna cable to be fed through the rail mount. The improved rail mount is further constructed and defined so that it can be inexpensively manufactured by conventional metal casting or plastic molding techniques from various metals or plastic materials.

From a structural standpoint, the mount is adapted to be secured to a supporting member, such as a rail or the like. The mount includes a U-shaped clamping strap having apertures defined adjacent each end, with each aperture having a different geometric configuration. The clamping strap conforms to the configuration of the supporting member. The clamping strap is used with a threaded securing post mountable between the arms of the U-shaped clamp at the apertures to be held therebetween. A second clamping member in the form of a hollow housing member has one end shaped to receive the ends of the strap with the post secured thereto and to be clamped to the opposite side of the supporting member. The hollow housing member has a cylindrical end for slidably receiving an L-shaped housing therein. The L-shaped housing has a stepped bore sized to be slidably received over the cylindrical end of the hollow housing member. A single threaded fastener mounted to the small bore of the stepped bore is mounted through the mount elements to be secured to the threaded post and when tightly secured thereto, tightly secures the thus defined mount to the supporting member.

BRIEF DESCRIPTION OF DRAWINGS

These and other features of the present invention may be more fully appreciated when considered in the light of the following specification and drawings in which:

FIG. 1 is an illustration of the mount as it may be secured to a horizontal tubular rail for a marine vessel or the like and embodying the invention;

FIG. 2 is an illustration of the mount of FIG. 1 as it may be secured to a vertical tubular rail for a marine vessel or the like;

FIG. 3 is a sectional view taken along the line 3—3 of FIG. 1 and illustrating an antenna secured to the mount by means of an antenna ferrule in dotted outline;

FIG. 4 is a sectional view taken along the line 4—4 of FIG. 3;

FIG. 5 is an exploded view of the elements of the mount detached from its supporting member;

FIG. 6 is a view taken along the line 6—6 of FIG. 2 and illustrating an antenna secured to the mount by means of an antenna ferrule in dotted outline; and FIG. 7 is a sectional view taken along the line 7—7 of FIG. 6.

DETAILED DESCRIPTION OF THE INVENTION

Now referring to the drawings, the mount 10 of the present invention will be described in detail. The mount 10 will be described as it may be employed as an antenna mount for a marine vessel or the like. To this end the preferred embodiment of the mount 10 is constructed and defined to be assembled to a rail R having a circular cross-sectional configuration, such as found on a marine vessel or the like.

The drawings illustrate the preferred embodiment of the mount as applicable to a tubular supporting member to secure an antenna to the tubular rail support and is adapted to mount a conventional antenna, such as a Loran antenna by means of a conventional antenna ferrule secured thereto. It should be recognized at the outset that the rail R merely acts as a supporting member for the mount 10 and the mount can be modified to be assembled to supporting members having other configurations, such as square, rectangular, or the like, with the configuration of the elements comprising the mount 10 shaped to compliment the shape of the supporting member to allow the mount to be clamped thereto in accordance with the teachings of the present invention. Alternatively, inserts can be used with the mount 10 to adapt it for mounting to a supporting member of a circular cross-sectional configuration to the configuration of a noncircular supporting member. The mount 10 as illustrated in FIGS. 1 and 2 is mounted to the outboard side of a tubular rail R for a marine vessel. The mount 10 is preferably positioned on the outboard side of the tubular mounting rail R to preserve space on the inboard side of the rail or within the vessel proper.

The elements that comprise the mount 10 for mounting to the tubular rail R can be best appreciated from examining FIG. 5 wherein the elements are illustrated in an exploded relationship, detached from the tubular supporting rail R. The mount 10 includes a pair of clamping members 12 and 13 mountable to opposite sides of the rail R to secure the assembled mount thereto. The first clamping member 12 comprises a U-shaped metallic strap having a configuration to be tightly mounted to the outside surface of the rail R. The opposite arms of the clamp 12 have apertures therein adjacent the free ends thereof for accommodating a securing post 12P therebetween. The apertures for the clamping strap 12 are each of a different geometric configuration so as to mount and hold the securing post 12P therebetween. As illustrated in FIG. 5, one of the post apertures 12C is of a circular configuration, while the opposite aperture 12S is of a square configuration. The dimensions of the aperture 12S conforms to the outside dimensions for the post 12P to slidably receive the post therein and to hold it in position between the arms of the strap 12. For this purpose, the post 12P proper has a square configuration that is slidably received within the inner periphery of the aperture 12S for the strap 12. At one end of the post 12P there is provided a circular disk 12D that has a diameter so as to allow it to fall within the outer perimeter of the square end of the square post 12P. The diameter of the disk 12D for the post 12P is selected relative to the diameter of the aperture 12C to allow the disk 12D to be slidably received within the aperture 12C. The relationship of the apertures 12C and 12S and the post 12P is such that when the post 12P is positioned between the arms of the clamping strap 12, the circular disk 12D for the post 12P will be slidably received within the aperture 12C so as to slidably engage the inner periphery of the aperture 12C. Similarly, the perimeter of the post 12P will be slidably received within the inside perimeter of the aperture 12S. It should be noted that when the strap is inverted from the position illustrated in FIG. 5, i.e., the circular aperture 12C is at the bottom, such as is preferable when mounting the mount 10 to the rail R on a marine vessel, the different configurations for the apertures 12C and 12S cause the post 12P to be supported on the strap 12 outside of the periphery of the aperture 12C to prevent the post 12P from sliding through the strap 12 and falling into the water, as would be the case when the strap 12 is oriented, as illustrated in FIG. 5. The post 12P is also constructed and defined to have a threaded aperture 12T extending therethrough intermediate the ends for securing the assembled elements of the mount 10 tightly together, as will be evident hereinafter.

The second clamping member 13 comprises a hollow rail clamping member having one end 13C constructed and defined to receive the apertured ends of the strap 12 when the post 12 is mounted thereto and having the end 13C shaped with a concave configuration defined to accommodate and tightly engage the outer periphery of the rail R on the opposite side of the rail from the strap 12. As illustrated, the end 13C is provided with a slot 13S of a width to slidably receive and engage an arm for the clamping strap 12. When assembled, and secured together, the clamping members 12 and 13 tightly engage the rail R on opposite sides thereof. The remaining end of the hollow clamping member 13 is defined with a cylindrical outer surface 13C' having a preselected outer diameter.

The outboard member of the mount 10 is the member 14 that is defined as a hollow L-shaped element. The hollow member 14 comprises a body member 14B having a stepped bore 14SB extending therethrough and sized at one end (the left hand end, as viewed in FIG. 5), to be slipped onto the outer cylindrical surface 13C' for the element 13 and to be rotatable thereon to preselected positions relative to the clamping member 13 before the elements of the mount 10 are finally tightly secured together. The stepped bore 14SB is reduced in diameter at the end opposite to the end that slidably receives the cylindrical surface 13C' to slidably receive the mount securing member in a slidable relationship therewith (see FIGS. 6 and 7, for example). The L-shaped member 14 provides a mounting post 14P extending outwardly of the body member 14 proper to provide a means to have a device attached thereto. As illustrated in FIG. 5, the mounting post 14P is externally threaded at 14PT to accommodate the conventional antenna ferrule for mounting the antenna thereto by means of the threads 14PT. The member 14 is also constructed and defined with a feed through aperture for accommodating the antenna cable to allow the cable to be fed through the assembled mount 10. The post 14P is constructed as a hollow post having a preselected inside diameter defining the bore 14PB and having an aperture 14A in communication with the bore 14PB at the inner end thereof. The opposite end of the body 14B from the aperture 14A is provided with a feed through aperture 14F that permits an antenna cable to be fed through the apertures 14PB, 14A and 14F and thereby be fed through the mount 10 proper.

The remaining element for the mount 10 is the fastener 15 which is employed for tightly securing the elements of the mount 10 together in an assembled relationship. For this purpose, the fastener 15 is illustrated as a socket head cap screw having a washer 16 mounted therewith for permitting the fastener 15 to be tightly secured to the outer face of the rotary housing 14 at the stepped bore at the end having the reduced diameter. This end of the housing 14 accommodates the screw cap in a smooth fashion so as to provide a smooth contour at the end of the housing; see FIGS. 3 and 6. The end of the fastener 15 is threaded so as to be secured into the threaded aperture 12T for the post 12P. When the threaded fastener is secured to the securing aperture 12T, the elements of the mount 10 may be loosely secured together in this fashion and thereby allow the positioning of the various parts relative to the rail R and then the two housing elements 13 and 14 to be rotated relative to one another to position the antenna or any other device mounted to the mounting post 14P of the housing 14 in any orientation desired.

With the above structure in mind, the elements comprising the mount 10 can be examined as they would be mounted to a tubular rail R in accordance with either FIG. 1 or FIG. 2, or a rail oriented somewhere in between the horizontal and vertical orientations illustrated in these figures. To assemble the elements to the rail R, the clamp 12 is poisitioned on one side of the rail to encircle it, with the clamping member 13 arranged on the opposite side of the rail, so as to secure the rail R in between the two. For this purpose, the post 12P is mounted between the arms of the strap 12. It should be noted that when the rail R is associated with a marine vessel and is positioned on the outside of the vessel, to prevent the post 12P from falling into the water in which the marine vessel is submerged, it is preferable to mount the strap 12 with the circular aperture 12C at the bottom and to allow post 12P with the disk portion 12D arranged within the aperture 12C so that the post will rest at the supporting surfaces 12SS against the adjacent face of the strap 12, as described hereinabove. In this fashion, the post 12P will not slip through the aperture to allow it to fall into the water and require additional time and effort to obtain a second post. In this configuration, the square end of the post 12P will be accommodated in the square opening 12C which would be arranged at the top of the strap 12. The arms of the strap 12T will be accommodated at the concave end 13C of the clamping member 13. The rotary housing member 14 can then be mounted to the cylindrical surface 13C for the clamping member 13. The assembly is completed by mounting the securing member 15 through the bore 14SB for the rotary mounting member 14 so that the fastener will be secured at its threaded end within the threaded aperture 12T for the post 12P. When the fastener 15 is threaded into the aperture 12T to loosely hold the elements in position, the mount 10 can be rotated around the rail R in any desired position in accordance with the application of the mount 10. Similarly, once the two clamping members 12 and 13 are positioned at the desired location on the rail R, the rotary housing member 14 can be oriented relative to the clamping housing 13 to position it in a desired position in accordance with the application of the mount 10. Once the desired positions for the elements are achieved, the fastener 15 may be tightly secured to the post 12P and then each of the aforementioned elements will be tightly secured to the rail R without marring the outer surface of the rail. In the arrangements illustrated in FIGS. 1 and 2, the mount 10 is in a position to accept an antenna which is illustrated in dotted outline in the drawings by threading a conventional antenna ferrule to the threaded portion 14PT for the post 14P. If the antenna carries electrical conductors or cable, they can be threaded through the assembled mount by feeding the lead wires through the aperture 14B, 14A and 14F.

It should now be appreciated that the present invention has advanced the state of the art by providing an improved, simple and relatively inexpensive rail mount that may be used for securing various objects thereto.

We claim:

1. A mount adapted to be secured to a mounting member such as a rail or the like comprising a U-shaped strap having an aperture defined adjacent each and thereof, each aperture having a different geometric configuration, the strap having a configuration corresponding to the mounting memeber it is mounted to for partially wrapping it around the mounting member; a post mountable to the strap between said strap apertures and having a configuration at opposite ends thereof corresponding to the configurations of said strap apertures; one of the strap apertures and one end of the post being defined to receive the post in a non-conforming relationship with the strap to secure the post to the strap by means of said one strap aperture and said one end of the post; said post having a threaded aperture intermediate the ends thereof; a hollow housing member having one end shaped to receive the strap with the post secured thereto and to be clamped to the opposite side of the mounting member to be secured thereto at a preselected position and, the opposite end of the hollow housing member having a circular outer configuration; a rotary housing having a central stepped bore with the larger bore being sized to be slidably received over the hollow housing member at the end having a circular outer configuration; said rotary housing including an upstanding mounting post adapted to have a device attached thereto; and a single threaded fastener mounted through the remaining end of the stepped bore to extend therethrough and through said hollow housing member to have its end secured to the threaded aperture for said post for tightly securing the thus defined mount together in a unitary assembly and to a mounting member.

2. A mount adapted to be secured to a mounting member as defined in claim 1 wherein said upstanding mounting post and the rotary housing having aperture means for permitting a lead wire to be readily fed through the thus defined mount by said aperture means.

3. A mount adapted to be secured to a mounting member such as a rail or the like for mounting a device thereto, said mount comprising U-shaped strap means having a configuration corresponding to the configuration of the mounting member to which it is to be mounted for wrapping the strap partially around the mounting member, said strap means being constructed and defined to removably engage a securing post between the ends of the strap means adjacent the open end of said U-shaped strap means, said securing post having a securing aperture arranged intermediate its ends and constructed and defined to be removably mounted to said ends of the strap means with the securing aperture longitudinally aligned with the longitudinal axis of the strap means; a hollow rail clamping member having one end constructed and defined to receive said ends of the strap means and having a configuration corresponding to the configuration of the mounting member to which it is to be mounted on the opposite side of the mounting member from the strap means to secure the mounting member therebetween, the opposite end of the clamping member being constructed and defined with a cylindrical outer configuration; a hollow L-shaped housing member comprising a body member having a stepped bore sized at one end to be rotatably mounted to said opposite end of the clamping member in a preselected rotary position relative to the clamping member, the stepped bore being reduced in diameter at the end opposite to said one end to slidably receive a securing member, the L-shaped mount providing a mounting post extending outwardly of the body member to provide means to have a device attached thereto; and securing means slidably mounted to the body member at said opposite end and defined to longitudinally extend through the body member and said clamping member to be secured to the securing post at the securing aperture for securing the thus defined mount to the mounting member.

4. A mount adapted to be secured to a mounting member as defined in claim 3 wherein said strap means is further characterized as including an aperture adjacent each end of the free ends of the strap to receive and removably mount the securing post, one of the apertures having the same geometrical configuration as the securing post to slidably receive the post through the one aperture, the other aperture having a geometric configuration defined relative to the geometric configuration of the post to arrest the travel of the post at the aperture.

5. A mount adapted to be secured to a mounting member as defined in claim 4 wherein the securing post has a square configuration at each end with a round disk secured to one end, the round disk fitting within the perimeter of the square, and said one aperture for the strap means defined to slidably receive the post comprising a square aperture, the other aperture for the strap means comprising a circular aperture for slidably receiving the round disk without permitting the post to slide therethrough.

6. A mount adapted to be secured to a mounting member as defined in claim 5 wherein said strap means is a metallic strap and at least said clamping member and said L-shaped housing are constructed of plastic.

7. A mount adapted to be secured to a mounting member as defined in claim 3 wherein the securing aperture for the post comprises a threaded aperture and said securing means comprises a single fastener threadedly secured to the threaded aperture, the fastener comprising a socket head cap screw.

* * * * *

UNITED STATES PATENT AND TRADEMARK OFFICE
CERTIFICATE OF CORRECTION

PATENT NO. : 4,546,949

DATED : October 15, 1985

INVENTOR(S) : Robert A. Millett and James A. Millett

It is certified that error appears in the above-identified patent and that said Letters Patent is hereby corrected as shown below:

Column 1, line 33, after "to" and before "the" insert a space;
Column 1, line 67, after "and" delete "-";

Column 6, line 3, change "memeber" to -- member --.

Signed and Sealed this

Twenty-ninth Day of April 1986

[SEAL]

Attest:

DONALD J. QUIGG

Attesting Officer

Commissioner of Patents and Trademarks